(12) United States Patent
Tsai et al.

(10) Patent No.: US 11,442,501 B2
(45) Date of Patent: Sep. 13, 2022

(54) DUAL DIRECTION POPUP CAMERAS

(71) Applicant: Hewlett-Packard Development Company, L.P., Spring, TX (US)

(72) Inventors: Ming-Shan Tsai, Taipei (TW); Chi-Wah Chan, Taipei (TW); Wei-Chih Tsao, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/048,134

(22) PCT Filed: Jul. 30, 2018

(86) PCT No.: PCT/US2018/044326
§ 371 (c)(1),
(2) Date: Oct. 16, 2020

(87) PCT Pub. No.: WO2020/027775
PCT Pub. Date: Feb. 6, 2020

(65) Prior Publication Data
US 2021/0149439 A1    May 20, 2021

(51) Int. Cl.
*G06F 1/16*    (2006.01)
*H04N 5/225*    (2006.01)

(52) U.S. Cl.
CPC .......... *G06F 1/1605* (2013.01); *G06F 1/1624* (2013.01); *G06F 1/1686* (2013.01); *H04N 5/2252* (2013.01)

(58) Field of Classification Search
CPC .... G06F 1/1605; G06F 1/1624; G06F 1/1686; H04N 5/2252; H04N 5/2257
See application file for complete search history.

(56) References Cited

U.S. PATENT DOCUMENTS

| | | | |
|---|---|---|---|
| 6,525,932 B1 | 2/2003 | Ohnishi et al. | |
| 6,812,958 B1* | 11/2004 | Silvester | G06F 1/1607 348/E5.026 |
| 7,677,815 B2 | 3/2010 | Lane et al. | |
| 9,197,850 B2 | 11/2015 | Koberling | |
| 10,708,398 B2* | 7/2020 | Yin | H04M 1/0264 |
| 10,747,273 B1* | 8/2020 | Wang | G06F 1/1686 |

(Continued)

FOREIGN PATENT DOCUMENTS

| | | |
|---|---|---|
| CN | 104023190 B | 2/2017 |
| WO | WO-2015028101 A1 | 3/2015 |

*Primary Examiner* — Amy R Hsu
(74) *Attorney, Agent, or Firm* — Perry + Currier Inc (57) ABSTRACT

An example device includes: A housing is mounted in a bezel. A camera holder is slideably mounted in the housing, the camera holder to slide in the housing between a recessed and an unrecessed position. A camera head is slideably mounted in the camera holder, the camera holder to slide between a downward position, when the camera holder is in the recessed position, and an upward position, when the camera holder is the unrecessed position. The camera head include a camera device angled outward, relative to the display, when the camera head is in the upward position and the camera holder is in the unrecessed position. The camera holder and the housing contains the camera head and the camera device, when the camera head is in the downward position and the camera holder is in the recessed position.

13 Claims, 12 Drawing Sheets

(56) References Cited

U.S. PATENT DOCUMENTS

| | | | |
|---|---|---|---|
| 10,999,518 B1* | 5/2021 | Lavallo | H04N 5/2257 |
| 2005/0128284 A1 | 6/2005 | Hoffer et al. | |
| 2005/0225668 A1 | 10/2005 | Kim | |
| 2010/0053409 A1* | 3/2010 | Chang | G06F 1/1686 |
| | | | 348/E5.022 |
| 2015/0183366 A1 | 7/2015 | Da Deppo et al. | |
| 2017/0171528 A1 | 6/2017 | Ent et al. | |
| 2017/0227731 A1* | 8/2017 | Eromäki | G03B 5/06 |
| 2017/0251131 A1 | 8/2017 | Wu et al. | |
| 2018/0004256 A1 | 1/2018 | Douglas et al. | |
| 2018/0219987 A1* | 8/2018 | Pantel | G06F 3/041 |

\* cited by examiner

DUAL DIRECTION POPUP CAMERAS

BACKGROUND

Webcams may be integrated with display screens or clipped to a chassis of a display screen or communication device, such as a laptop. However, such webcams are generally configured to move only between a closed position and an open position using a simple spring mechanism; hence, in the open position, the webcam faces directly outward (e.g. parallel to a display screen) and a user may have to move their face according to the outward direction of the webcam, which is ergonomically inconvenient, and could lead to neck pain, and the like, in the user.

BRIEF DESCRIPTION OF THE DRAWINGS

Reference will now be made, by way of example only, to the accompanying drawings in which.

DETAILED DESCRIPTION

Some webcams are either integrated into a display screen and/or a laptop, and the like, and/or may be clipped to the display screen and/or laptop, and the like, and may be moved between an open position and a closed position using a simple spring mechanism. For example, a webcam may be mounted on a side of a display screen of a laptop, and the webcam may eject out toward the top of the display screen, for example parallel to the display screen. Similarly, a webcam may be mounted to the top of a display screen and pop out of a housing, again parallel to the display screen. Similarly, a webcam may be integrated into a display screen and pop up from the top of the display screen, or a side of the display screen, again parallel to the display screen. Some webcams may not be moveable but include a cover that moves between an open position and a closed position, with the webcam again parallel to the display screen. In each instance, the display screen may be moved to also move the webcam angle, but this may not be convenient for the user. Furthermore, this may be ergonomically inconvenient, and could lead to neck pain, and the like, in the user.

Hence, provided herein is a device that includes a dual direction popup camera that may be used as a webcam; the device is located at a bezel of a display screen, and which may be proximal a bottom edge of the display screen (however, the device may be located in other locations). A camera holder is located in a housing in the bezel. The camera holder holds the camera device (e.g. the popup camera); when pressure is applied to the front of the camera holder, the camera holder pops out of the housing, and a camera head that includes the camera device, pops upwards, the camera device being angled outward relative to the display screen, a position which may be more ergonomic. Hence, the camera device pops upwards and outwards, in dual directions.

Figure 1:
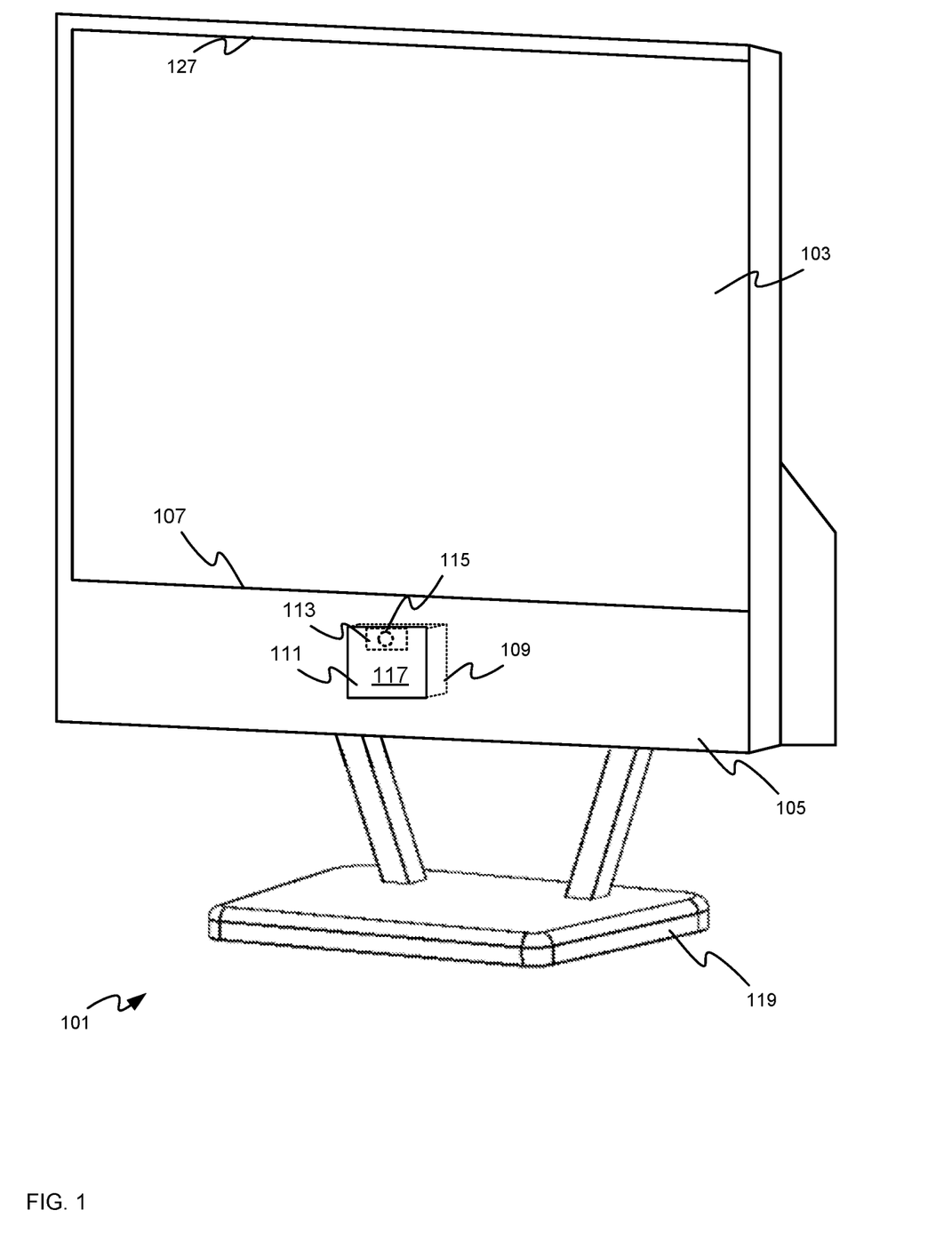
FIG. 1 is a side perspective view of an example device that includes a dual direction popup camera, the example device in a closed configuration.
Figure 2:
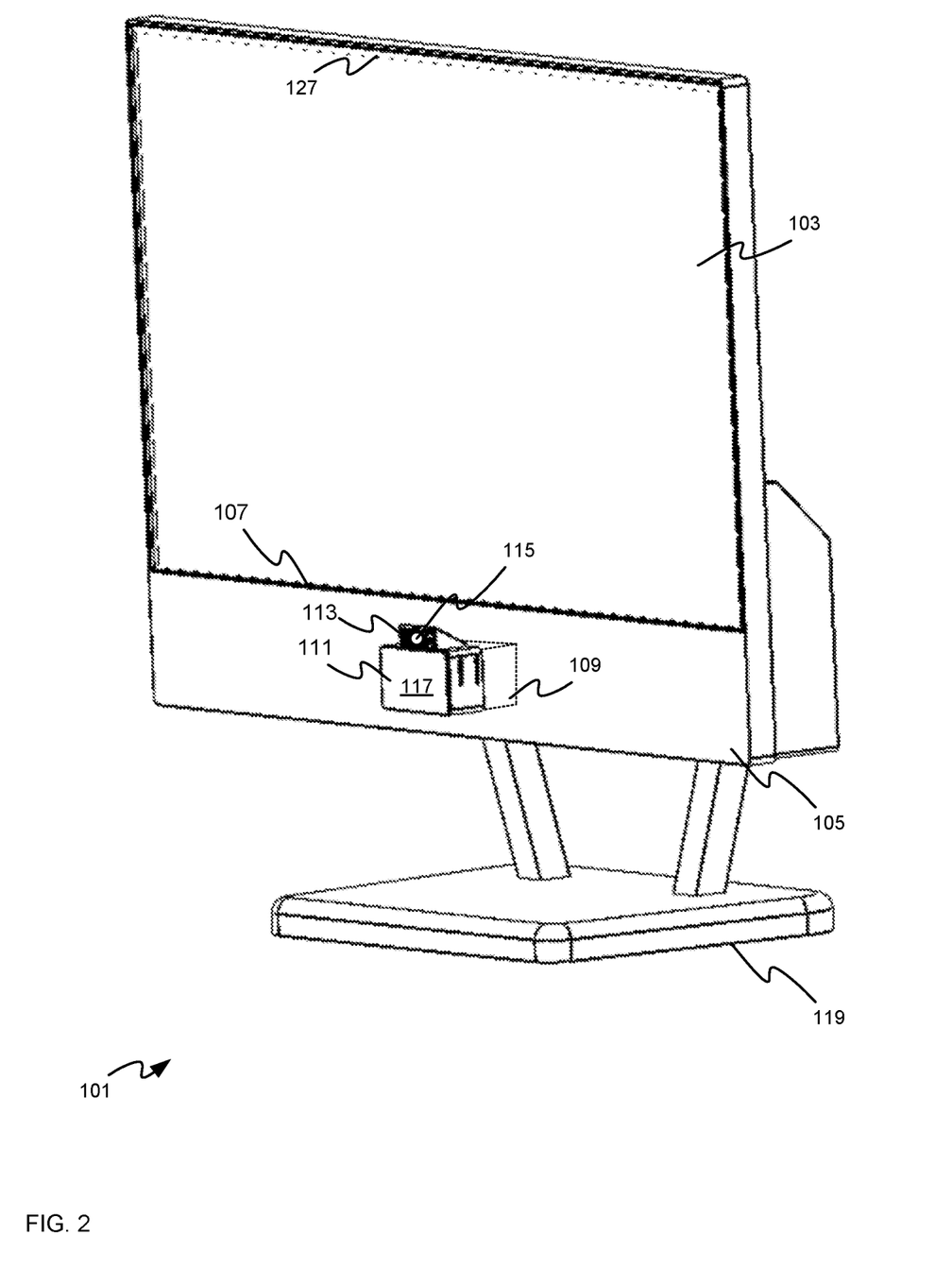
FIG. 2 is a side perspective view of the example device of FIG. 1 in an open configuration.

Referring to FIG. 1, FIG. 2, a device 101 that includes a dual direction popup camera is depicted in perspective. In FIG. 1, the device 101 is in a closed configuration and/or a recessed configuration, and in FIG. 2, the device 101 is in an open configuration and/or an unrecessed configuration.

The device 101 comprises: a display screen 103 having a bezel 105 (e.g., the bezel 105 may surround the display screen 103), the display screen 103 having a bottom edge 107; a housing 109 mounted in the bezel 105 proximal the bottom edge 107 of the display screen 103; a camera holder 111 slideably mounted in the housing, the camera holder 111 to slide in the housing between a recessed position (e.g., depicted in FIG. 1) and an unrecessed position (e.g., depicted in FIG. 2); a camera head 113 slideably mounted in the camera holder 111, the camera head 113 to slide between a downward position (e.g., depicted in FIG. 1), when the camera holder 111 is in the recessed position, and an upward position (e.g., depicted in FIG. 2), when the camera holder 111 is the unrecessed position; the camera head 113 including a camera device 115 angled outward (and, for example, upward), relative to the display screen 103, when the camera head 113 is in the upward position and the camera holder 111 is in the unrecessed position; and the camera holder 111 and the housing 109 containing the camera head 113 and the camera device 115, when the camera head 113 is in the downward position and the camera holder 111 is in the recessed position.

In FIG. 1 and FIG. 2, the housing 109 is located internal to the bezel 105, as indicated by the housing 109 being depicted in dashed lines. Similarly, in FIG. 1, the camera head 113 and the camera device 115 are depicted in dashed lines as, when the camera holder 111 is in a recessed position, an outward face 117 of the camera holder 111 is flush with the bezel 105, and the camera head 113 and the camera device 115 are contained in the camera holder 111 and the housing 109. Hence, for example, a size and/or shape of the housing 109 and camera holder 111 are such that, when the camera holder 111 is in the recessed position in the housing 109, the outward face 117 of the camera holder 111 is flush with the bezel 105.

As also depicted in FIG. 1 and FIG. 2, the device 101 may comprise a stand 119 to hold the device 101 in an upright position. As also depicted, the display screen 103 has a top edge 127 opposite the bottom edge 107. When the stand 119 is holding the device 101 in an upright position, the bottom edge 107 is towards the stand 119 and the top edge 127 is away from the stand 119. Indeed, while directions "up" and "down" are used herein to describe example devices, the directions may be independent of the ground and/or the earth, but with respect to the display screen 103, however the display screen 103 may generally positioned in an upright position with respect to a surface on which the device 101 is being used.

Figure 3:
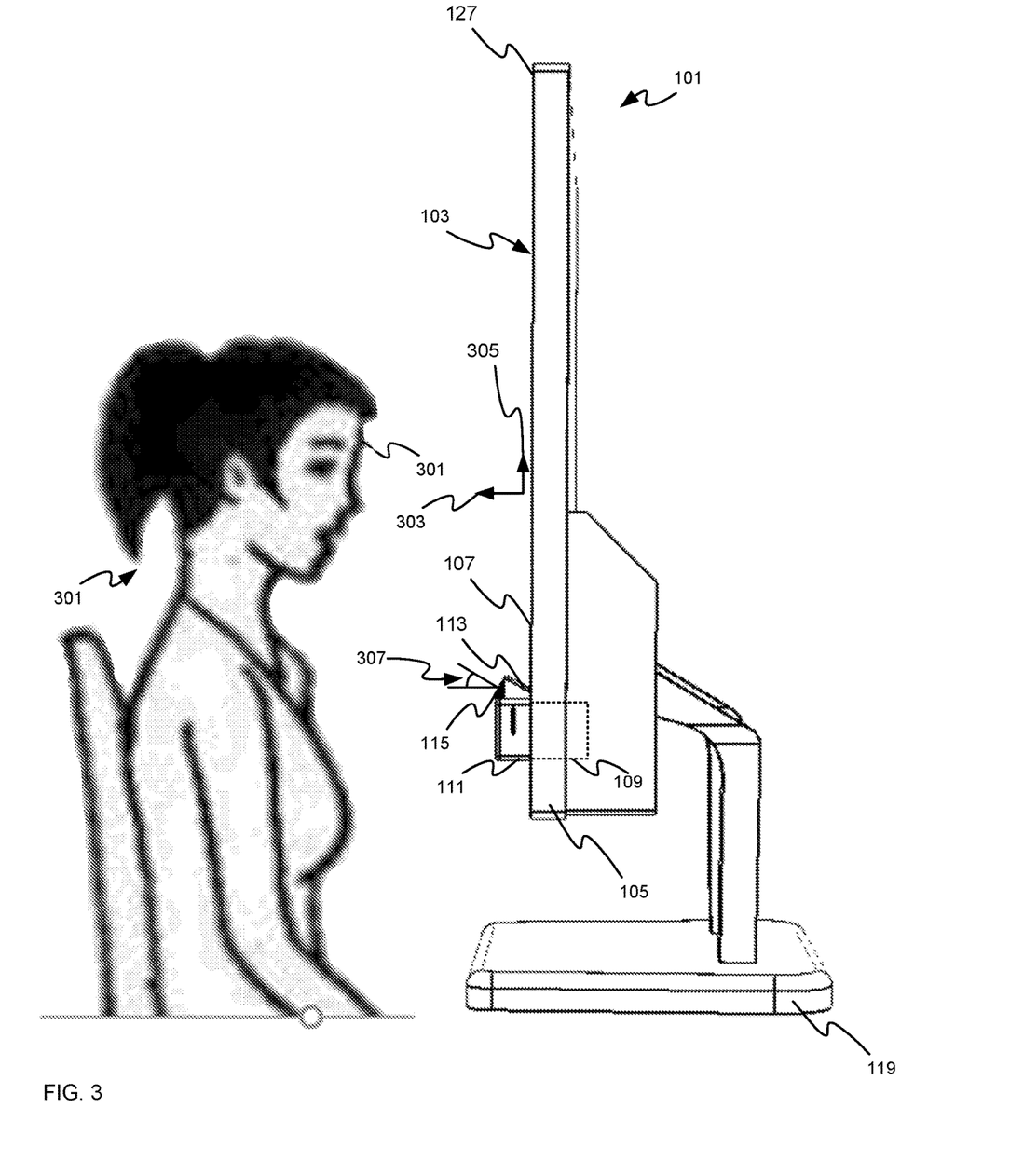
FIG. 3 is a side view of the example device of FIG. 1 in use in the open configuration.

Attention is next directed to FIG. 3 which depicts a side view of the device 101 in use with a user 301 when the device 101 is in the open configuration. In particular, in FIG. 3, the camera holder 111 is in the unrecessed position, and the camera head 113 is in the upward position, such that the camera device 115 is angled outward (and, for example, upward), relative to the display screen 103. For example, an outward direction 303 may be a normal to the display screen 103, and an upward direction 305 may be perpendicular to the bottom edge 107 of the display screen 103 and towards the top edge 127 of the display screen 103 (e.g., a direction pointing from the bottom edge 107 to the top edge 127). Hence, the camera device 115 is angled outward (and, for example, upward), for example at an angle 307 which may be selected to be ergonomically convenient for the user 301 to look into the camera device 115.

Hence, the camera device 115 may be used as webcam and the user 301 may communicate in a web-based and/or Internet based communication session, using the camera device 115 as a webcam.

While present examples are described with respect to the housing 109 being mounted in the bezel 105 proximal the bottom edge 107 of the display screen 103, the housing 109, and/or the device 101, may be mounted in other regions of the bezel 105, for example, at a side of the bezel 105 or a top of the bezel 105 or proximal other edged of the display screen 103 other than the bottom edge 107. In such examples, the device 101 is positioned in the bezel 105 such that the camera device 115 is angled outward and towards the user 301 when the camera head 113 is in the upward position and the camera holder 111 is in the unrecessed position. For example, when the device 101 is mounted at a top of the bezel 105, the camera device 115 may be angled outward and downward towards the user 301 when the camera head 113 is in the upward position and the camera holder 111 is in the unrecessed position.

Attention is next directed to FIG. 4, FIG. 5, FIG. 6, and FIG. 7, which depict a device and/or assembly 401 that may be used with the device 101 of FIG. 1, FIG. 2, and FIG. 3. The device and/or assembly 401 is referred to hereafter as the assembly 401 and may be provided independent of the device 101. The assembly 401 generally comprises the housing 109, the camera holder 111, the camera head 113 and the camera device 115. The assembly 401 may be provided and/or sold separate from the display screen 103.

Figure 4:
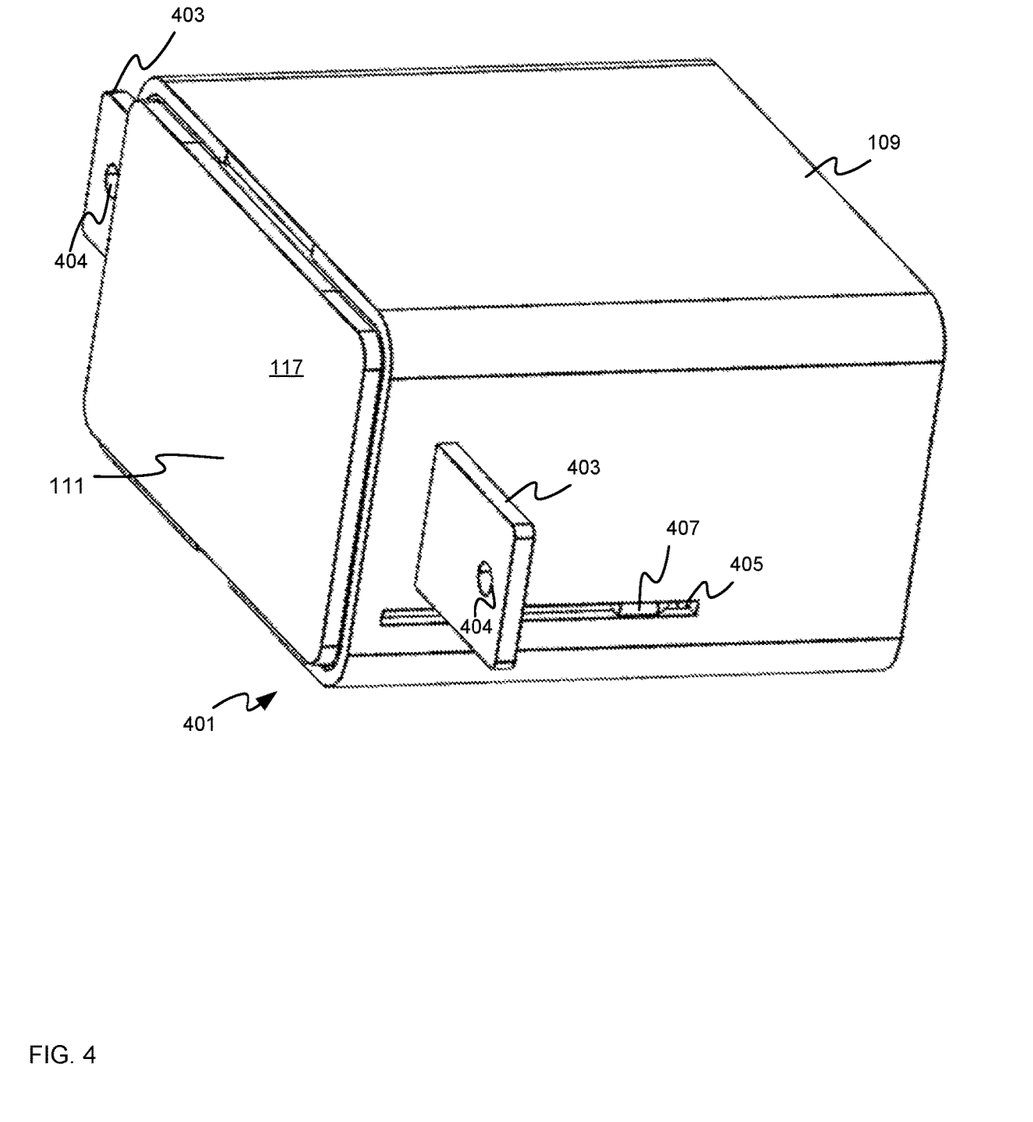
FIG. 4 depicts a front and side perspective view of an example assembly that includes a dual direction popup camera, in a closed configuration, that may be used with the example device of FIG. 1.
Figure 5:
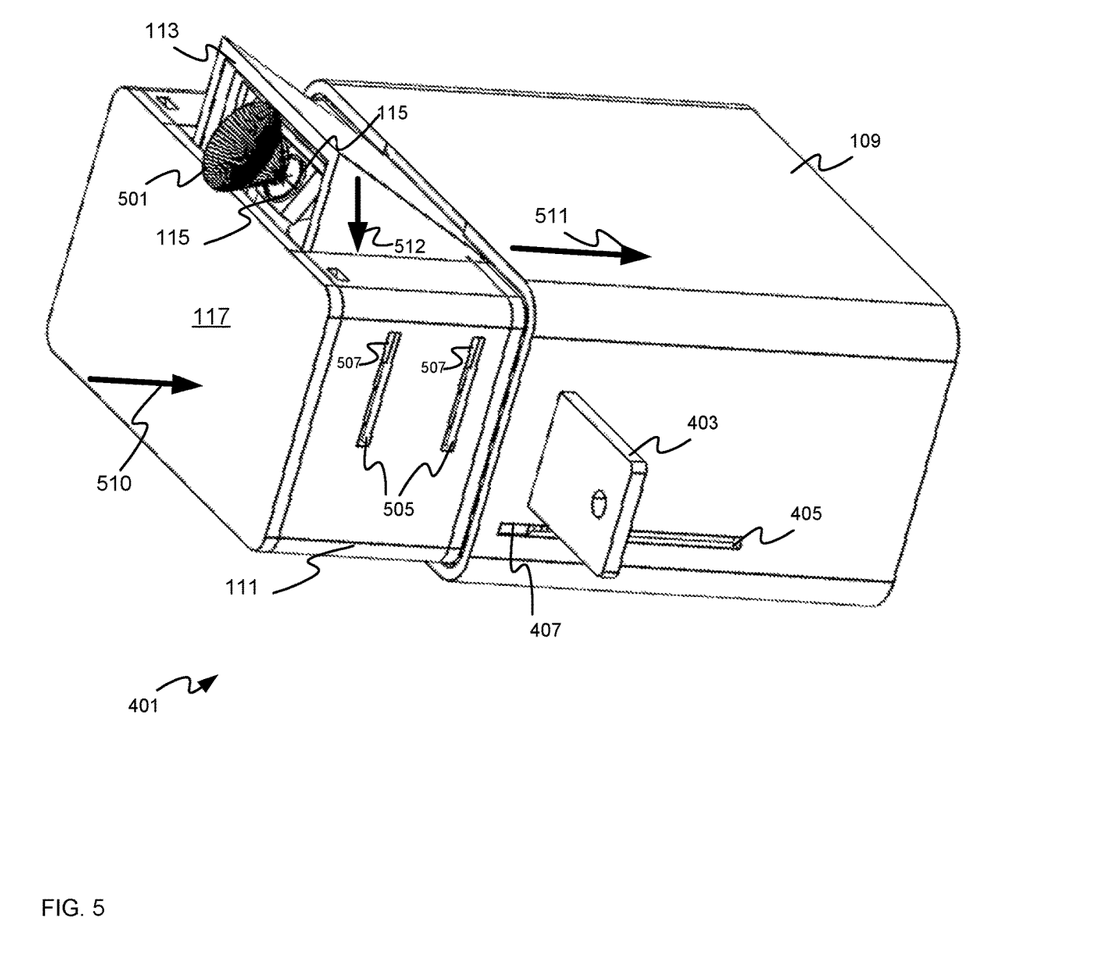
FIG. 5 depicts a front and side perspective view of the example assembly of FIG. 4 in an open configuration.
Figure 6:
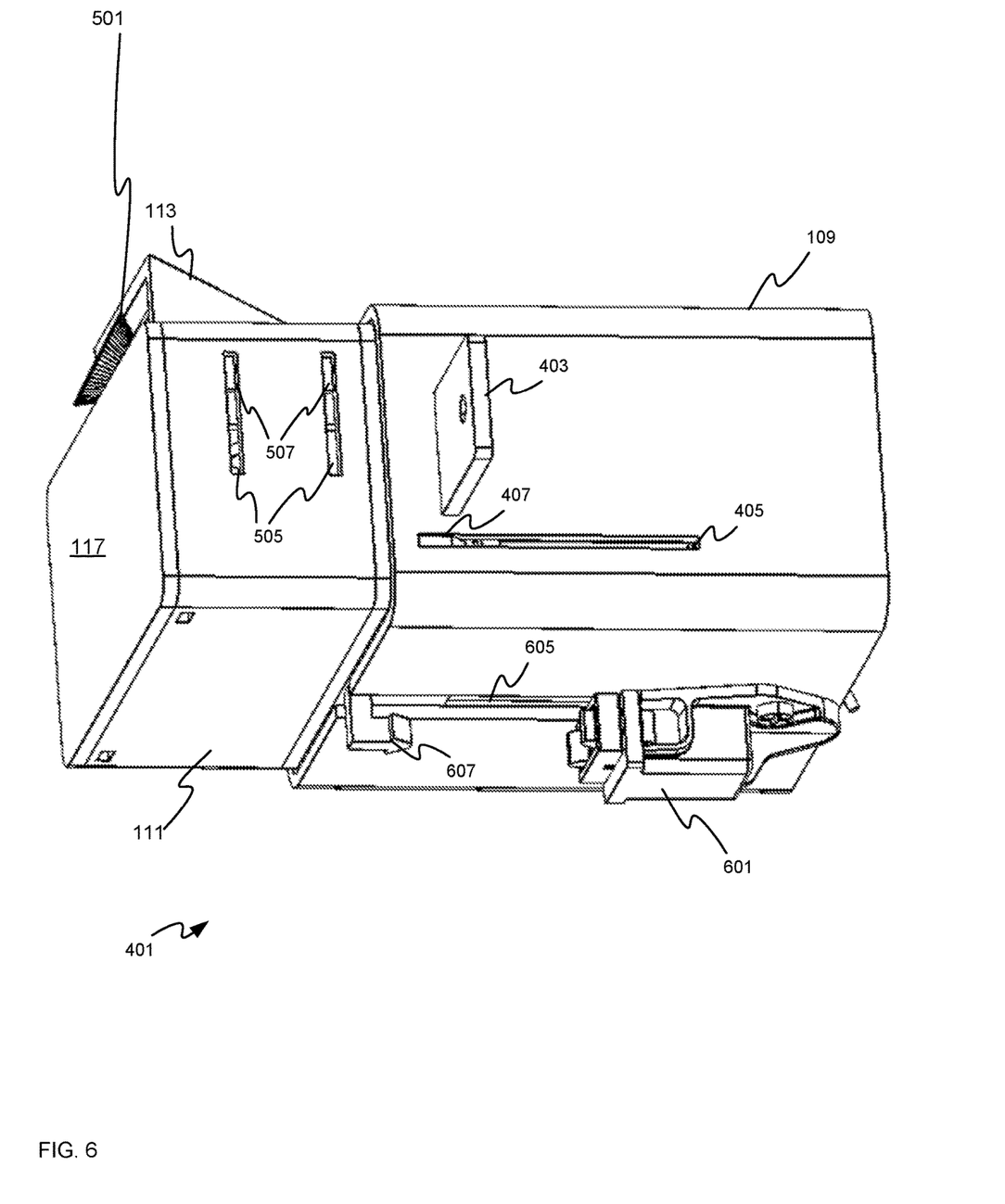
FIG. 6 depicts a side and bottom perspective view of the example assembly of FIG. 4 in an open configuration.
Figure 7:
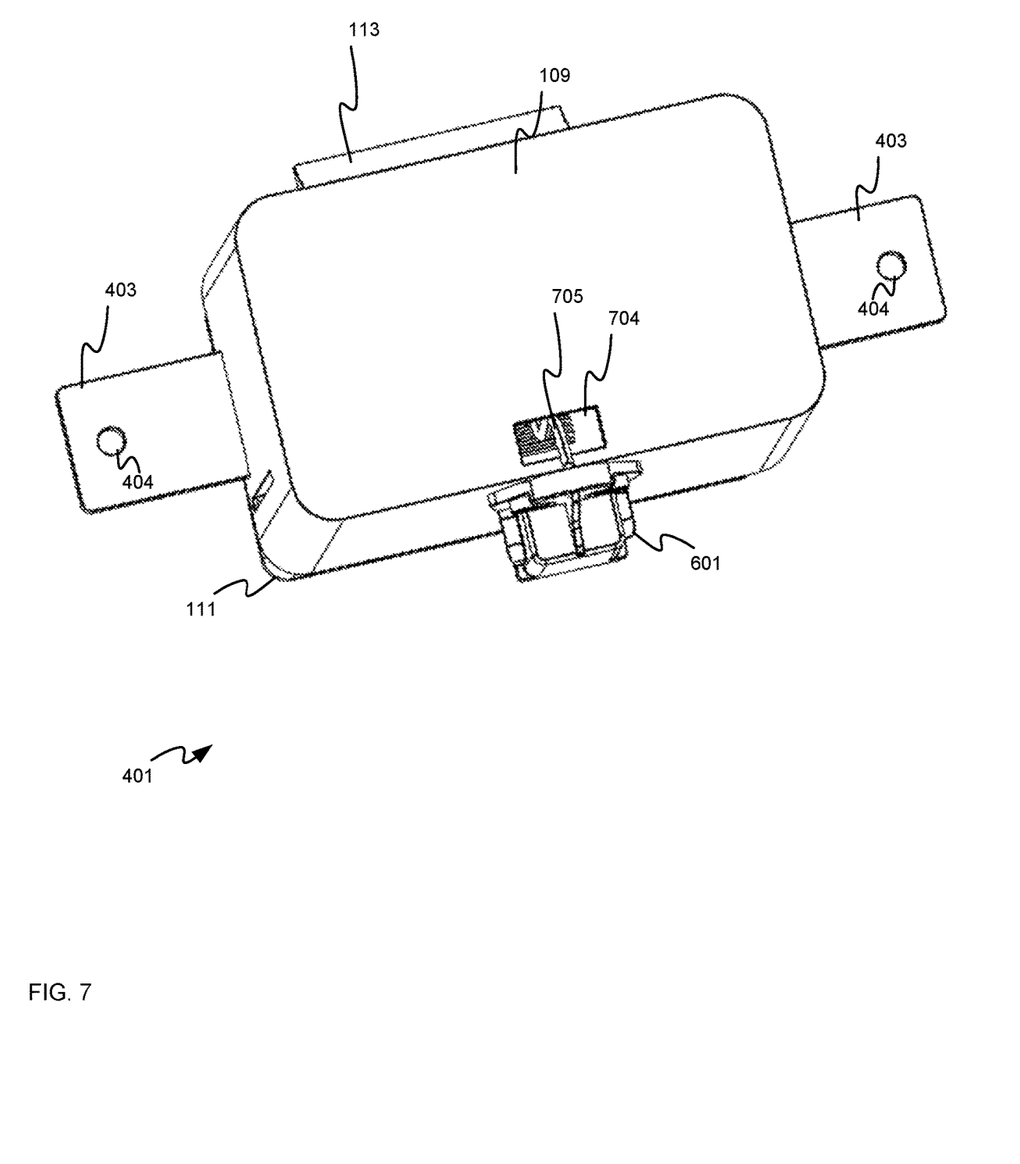
FIG. 7 depicts a rear perspective view of the example assembly of FIG. 4.

FIG. 4 depicts a front perspective view of the assembly 401, when the assembly 401 is in a closed configuration, and hence the camera holder 111 and the camera head 113 have been received in the housing 109, with the outward face 117 of the camera holder 111 visible in FIG. 4. FIG. 5, FIG. 6, and FIG. 7 respectively depict the assembly 401 in a front perspective view, a bottom perspective view and a rear perspective view, when the assembly 401 is in an open configuration; hence, the camera holder 111 and the camera head 113 extend from the housing 109 with the camera holder 111 in an unrecessed position and the camera head 113 in an upward position.

FIG. 5 and FIG. 6 further depict a sensing cone 501 of the camera device 115, for example a field of view and the like, such that the camera device 115 may acquire images of objects that are within the field of view of the camera device 115 as indicated by the sensing cone 501.

As best seen in FIG. 4 and FIG. 7, the housing 109 comprises a pair of tabs 403 extending from opposite sides of the housing 109, the tabs 403 to attach the assembly 401 to the bezel 105, described below. Each of the tabs 403 include a respective aperture 404 through which screws, bolts and the like maybe inserted to attach the assembly 401 to the bezel 105, for example see FIG. 8 described below.

As best seen in FIG. 4, FIG. 5, and FIG. 6, the assembly 401 (and hence the device 101, when the assembly 401 is installed therein) further comprises a guide mechanism at the housing 109 and/or the camera holder 111, to guide the camera holder 111 to slide within the housing 109 between the unrecessed and the recessed positions. For example, as depicted, the guide mechanism of the assembly 401 (and also the device 101, when the assembly 401 is installed therein) comprises slots 405 and complementary pins 407 at the housing 109 and the camera holder 111, the slots 405 and complementary pins 407 to guide the camera holder 111 between the unrecessed position and the recessed position in the housing 109.

For example, the housing 109 further includes a pair of slots 405 on either side of the housing 109, and the camera holder 111 includes pins 407 that extend from corresponding sides of the camera holder 111 and slide in the slots 405 of the housing 109. For example, the housing 109 receives the camera holder 111 therein, and the pins 407 slide in the slots 405. While one of two sets of slots 405 and pins 407 are visible in the figures, it is understood that another sets of slots 405 and pins 407 are present on an opposite side of each of the housing 109 and the camera holder 111.

The movement and/or position of the pins 407 in the slots 405 further define the position of the camera holder 111 with respect to the housing 109 in the unrecessed position. For example, as best seen in FIG. 5, the pin 407 is in a forward position at a forward end of the slot 405.

As best seen in FIG. 5 and FIG. 6, the assembly 401 (and hence the device 101, when the assembly 401 is installed therein) further comprises a guide mechanism at the camera holder 111 and/or the camera head 113, to guide the camera head 113 between the upward position and the downward position in the camera holder 111. For example, as depicted, the guide mechanism of the assembly 401 (and also the device 101, when the assembly 401 is installed therein) comprises slots 505 and complementary pins 507 at the camera holder 111 and the camera head 113, the slots 505 and complementary pins 507 to guide the camera head 113 between the upward position and the downward position in the camera holder 111.

For example, the camera holder 111 further includes two pairs of slots 505 on either side of the camera holder 111, and the camera head 113 includes respective complementary pins 507, one for each slot 505, that extend from corresponding sides of the camera head 113 and slide within slots 505 of the camera holder 111. For example, the camera holder 111 receives the camera head 113 therein, and the pins 507 slide in the slots 505. While two of four sets of slots 505 and pins 507 are visible in the figures, it is understood that another two sets of slots 505 and pins 507 are present on an opposite side of each of the camera holder 111 and the camera head 113. The movement and/or position of the pins 507 in the slots 505 further define the position of the camera head 113 with respect to the camera holder 111 in the upward position.

FIG. 5 further depicts an arrow indicative of pressure 510 that may be applied normal to the outward face 117 of the camera holder 111, and towards the housing 109, to move the camera holder 111 into the recessed position, for example in a direction 511 in which the camera holder 111 slides into the housing 109 (e.g., according to the slots 405 and the pins 407).

Figure 10A:
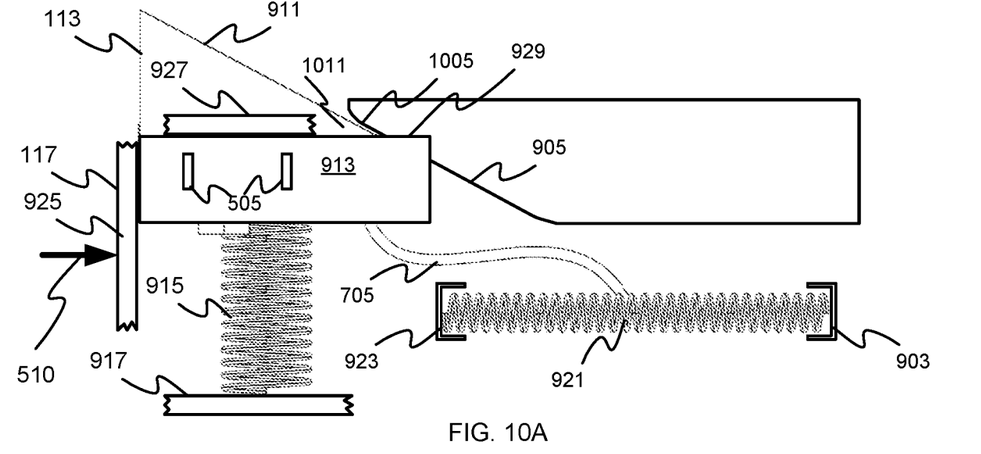
FIG. 10A depicts a camera head of the assembly of FIG. 4 in an upward position and relative to other components.
Figure 10B:
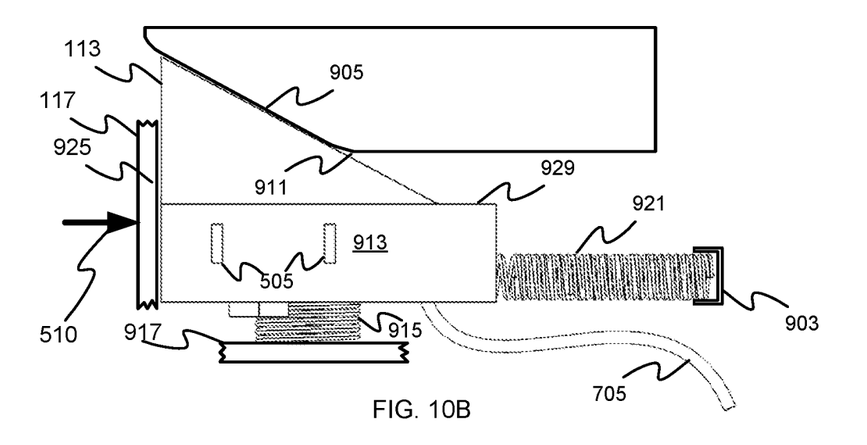
FIG. 10B depicts a camera head of the assembly of FIG. 4 in a downward position and relative to other components.

FIG. 5 further depicts a direction 512 in which the camera head 113 moves into the downward position when the pressure 510 is applied to the outward face 117 of the camera holder 111, in which the camera head 113 slides into camera holder 111 (e.g., according to the slots 505 and the pins 507). Movement of the camera head 113 will be described in more detail below with respect to FIG. 10. However, in general, the camera head 113 may be biased towards the upward position, for example using springs and the like.

Similarly, the camera holder 111 may be biased towards the unrecessed position, for example using springs and the like. However, when the camera holder 111 is moved into the recessed position, the camera holder 111 may be temporarily latched and/or held, and the like, into the recessed position.

For example, as best seen in FIG. 6, the assembly 401 (and hence the device 101, when the assembly 401 is installed therein) further comprises a latch device 601 to receive and latch the camera holder 111 when the camera holder 111 slides to the recessed position, the latch device 601 to release the camera holder 111 from the recessed position when pressure is received at an outward face 117 of the camera holder 111. For example, the latch device 601 may comprise a push-push latch device to receive and latch the camera holder 111 when the camera holder 111 slides to the recessed position, the push-push latch device to also release the camera holder 111 from the recessed position when pressure is received at an outward face 117 of the camera holder 111.

For example, as depicted, the push-push latch of the latch device 601 is attached to a bottom side of the housing 109. The housing 109 further comprises a slot 605 along a bottom side of the housing 109, and the camera holder 111 comprises a pin 607 extending from a bottom side of the camera holder 111. The slot 605 and the pin 607 are positioned such that the pin 607 extends through the slot 605 and sides along the slot 605. As the camera holder 111 is sliding from the unrecessed position to the recessed position (e.g., when the pressure 510 is applied to the outward face 117 of the camera holder 111), the pin 607 mates with the push-push latch in the recessed position of the camera holder 111 such that the push-push latch temporarily latches and/or secures the pin 607 to temporarily secure and/or hold the camera holder 111 in the recessed position.

Such a movement of the camera holder 111 further causes the camera head 113 to move to the downward position. Hence, the camera holder 111 and the camera head 113 are contained in the housing 109 and latched in place using the latch device 601.

When pressure is applied to the outward face 117 of the camera holder 111 in the recessed position, such pressure is translated to the pin 607 and to the push-push latch, which releases the pin 607, and hence the camera holder 111 is also released. As the camera holder 111 is biased towards the unrecessed position, and the camera head 113 is biased towards the upward position, the latch device 601 releasing the camera holder 111 causes the camera holder 111 to automatically move to the unrecessed position, and the camera head 113 to automatically move to the upward position.

Attention is next directed to FIG. 7 which depicts a rear perspective view of the assembly 401. In particular, FIG. 7 shows both tabs 403 and both apertures 404 therethrough. FIG. 7 further depicts an aperture 704 through a back wall of the housing 109, and through which a cable 705 of the camera device 115 extends. The cable 705 may be connected to the display screen 103 and/or a computing device and/or communication device, and the like, and may convey images acquired by the camera device 115 (e.g., within the sensing cone 501) to the display screen 103 and/or a computing device and/or communication device, and the like, for example in a communication session. The cable 705 may also be to provide power to the camera device 115.

Figure 8:
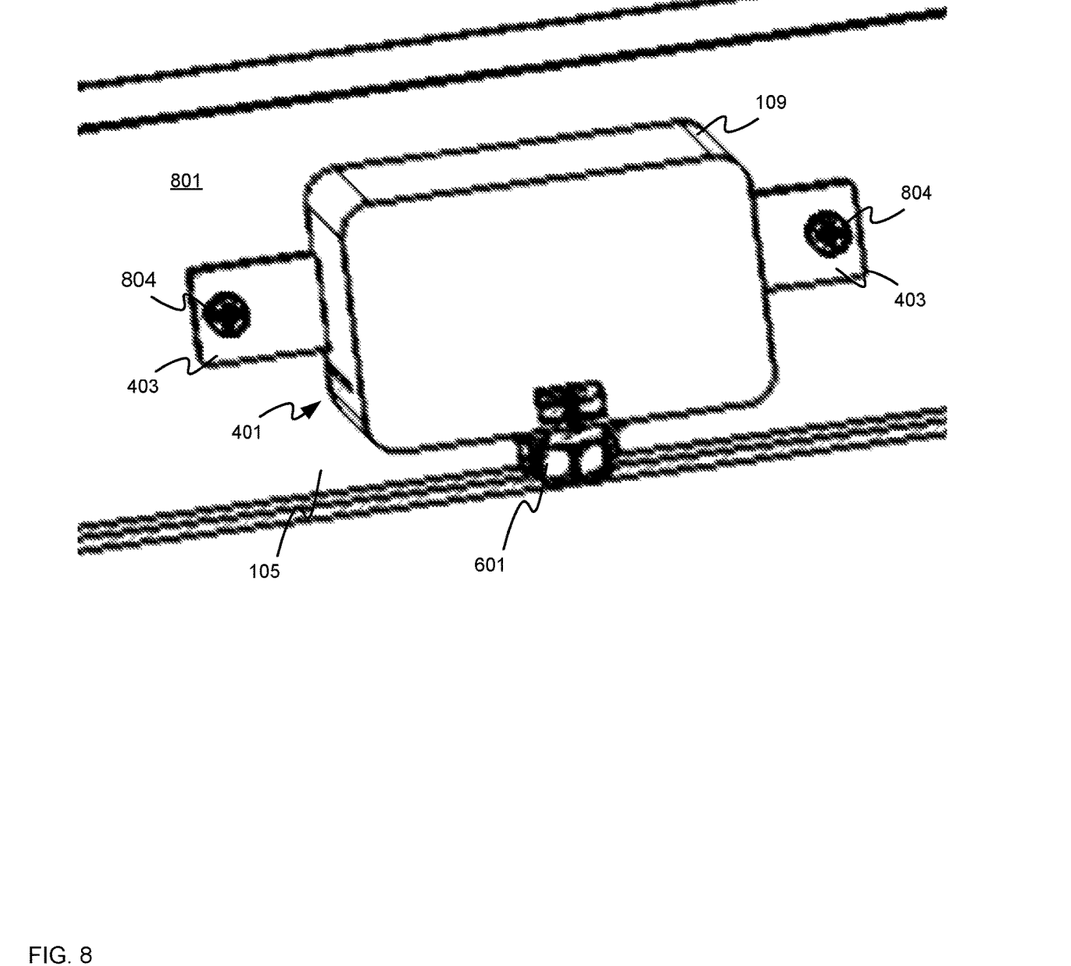
FIG. 8 depicts the example assembly of FIG. 4 attached to the bezel of the device of FIG. 1.

Attention is next directed to FIG. 8 which depicts a rear perspective view of the assembly 401 mated with the bezel 105 of the device 101. In particular, as depicted, the assembly 401 has been mounted at an interior surface 801 by attaching the tabs 403 to the interior surface 801 via bolts 804, and the like, inserted through the respective apertures 404 (not visible in FIG. 8) and mated with respective threaded holes (also not visible in FIG. 8) of the interior surface 801 of the bezel 105.

Figure 9A:
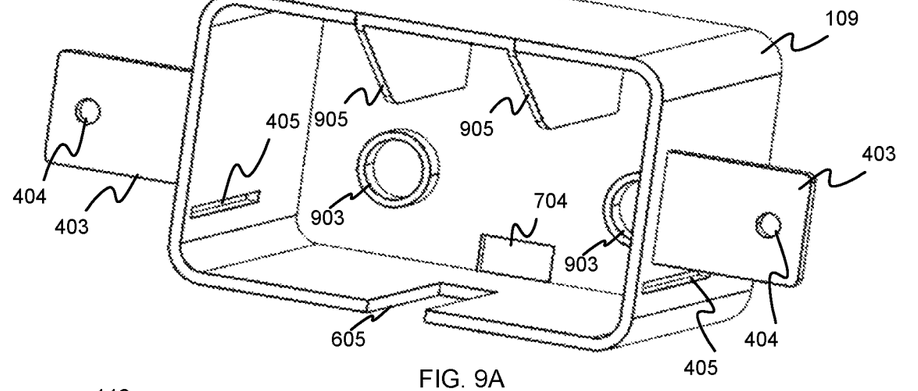
FIG. 9A depicts an example housing of the example assembly of FIG. 4.
Figure 9B:
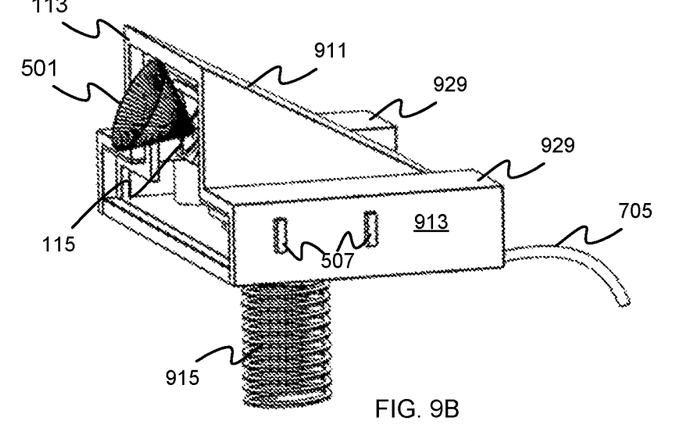
FIG. 9B depicts an example camera head of the example assembly of FIG. 4.
Figure 9C:
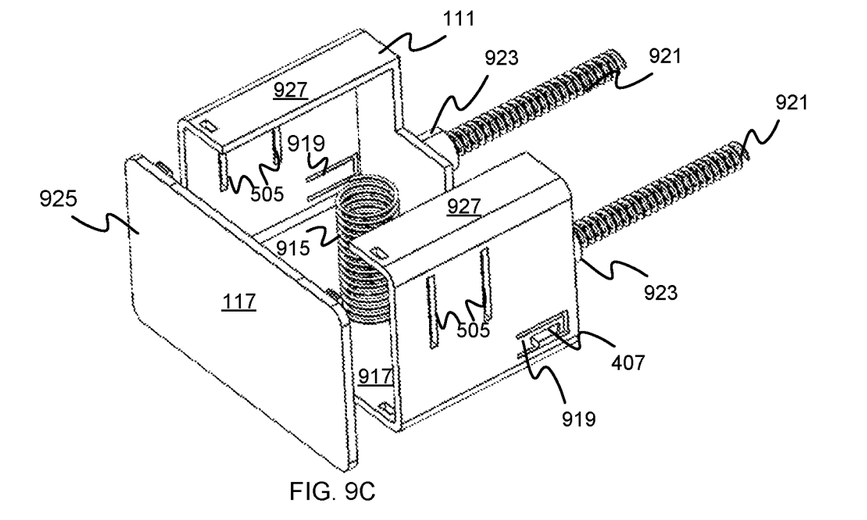
FIG. 9C depicts an example camera holder of the example assembly of FIG. 4.

Attention is next directed to FIG. 9A, FIG. 9B and FIG. 9C, which depict respective perspective views of the housing 109, the camera head 113, and the camera holder 111.

In particular FIG. 9A depicts an interior of the housing 109; indeed, in general, the housing 109 includes an opening for receiving the camera holder 111 therein, and FIG. 9A depicts the interior of the housing 109 through this opening. FIG. 9A further shows both slots 405 on opposite sides of the housing 109, as well as both tabs 403 and their respective apertures 404, the slot 605 in a bottom side of the housing 109, and the aperture 704. In particular, FIG. 9A also depicts seats 903 for receiving respective springs to bias the camera holder 111 into the unrecessed position. FIG. 9A also depicts an angled guide (e.g., at least one angled rib 905) along a ceiling of the housing 109, the angled guide to press on an angled top of the camera head 113 as the camera holder 111 is sliding into the recessed position to guide the camera head 113 into the downward position, as described in more detail below with respect to FIG. 10A and FIG. 10B. As depicted, angled guide and/or the housing 109 comprises at least one angled rib 905 (as depicted, two angled ribs 905) along a ceiling of the housing 109 (e.g., in the interior of the housing 109). As depicted, a portion of the angled ribs 905 that interact with the camera head 113 are angled (e.g., see FIG. 10), with a remainder of the angled ribs 905 being any shape to attach the angled ribs 905 to the housing 109 and not interfere with the movement of the camera holder 111 into the housing 109.

As depicted, with reference to FIG. 9B, the guide mechanism, and the camera head 113, further comprises an angled top 911 of the camera head 113, the angled top 911 to slide along the angled ribs 905, the angled ribs 905 to press on the angled top 911 of the camera head 113 as the camera holder 111 is sliding into the recessed position to guide the camera head 113 into the downward position. For example, see FIG. 10, described below.

FIG. 9B also depicts one of the sets of the pins 507 extending from a side of a chassis 913 of the camera head 113 visible in FIG. 9B, the sensing cone 501 of the camera device 115, and the cable 705. In particular, FIG. 9B further depicts a spring 915 extending from a bottom side of the camera head 113, which biases the camera head 113 in the upward position.

For example, with reference to FIG. 9C, which also depicts the spring 915 in relation to the camera holder 111, the spring 915 may extend from the bottom interior surface 917 of the camera holder 111, the bottom interior surface 917 of the camera holder 111 acting as a seat for the spring 915, the spring 915 biasing the camera head 113 in the upward position. In particular, the spring 915 compresses against the bottom interior surface 917 when the camera head 113 is moved towards the downward position, the spring 915 thereby biasing the camera head 113 towards the upright position as the pins 507 of the camera head 113 slide along the slots 505 of the camera holder 111.

FIG. 9C also depicts one of the pins 407 extending from opposite sides of the camera holder 111, each of the pins 407 on respective flexible tabs 919, extending along the respective opposite sides in the location of the pins 407. FIG. 9C depicts an exterior side of one of the flexible tabs 919 where a visible pin 407 is located, and an interior side of the other of the flexible tabs 919; it is understood that, while the second pin 407 is not visible, a pin 407 extends outward from each of the flexible tabs 919.

FIG. 9C further depicts a pair of springs 921 extending from respective seats 923 at a rear exterior wall of the camera holder 111. It is understood that, when the assembly 401 is assembled, the pair of springs 921 also extend to respective seats 903 of the housing 109, and bias the camera holder 111 towards the unrecessed position. In particular, the springs 921 compress against the respective seats 903 as the pins 407 of the camera holder 111 slide along the slots 405 of the housing 109.

FIG. 9C further depicts a front plate 925 that includes the outward face 117 of the camera holder 111; as depicted the front plate 925 is detached from the remainder of the camera holder 111 and may be attached to the remainder of the camera holder 111 using tabs and slots and the like. For example, the camera head 113 may be inserted into the camera holder 111 by removing the front plate 925. Furthermore, the camera holder 111 includes an aperture through which the camera head 113 extends in the upward position, with wings 927 extending from either side of the aperture against which shoulders 929 of the chassis 913 of the camera head 113 reside when in the upward position. Indeed, when the camera head 113 is biased in the upward position, the wings 927 of the camera holder 111 oppose the shoulders 929 of the chassis 913 of the camera head 113.

Attention is next directed to FIG. 10A and FIG. 10B which respectively depict side views of the camera head 113 in the upward position and the downward position relative to components of the housing 109 and the camera holder 111. It is understood that in FIG. 10A, the camera holder 111 is in the unrecessed position and in FIG. 10B, the camera holder 111 is in the recessed position. While not all components of the housing 109 and the camera holder 111 are depicted, they are nonetheless assumed to be present.

In particular, FIG. 10A and FIG. 10B further depict the camera head 113 in relation to each of the bottom interior surface 917 and front plate 925 of the camera holder 111, the springs 915, 921, the angled ribs 905 and the seats 903 of the housing 109, in each of the upward position and the downward position.

FIG. 10A further depicts a shoulder 929 of the chassis 913 of the camera head 113 in relation to a wing 927 of the camera holder 111, in the upward position. In particular, when the camera head 113 is biased in the upward position, the wings 927 of the camera holder 111 oppose the shoulders 929 of the chassis 913 of the camera head 113.

FIG. 10A and FIG. 10B further depict the respective position of the angled top 911 of the camera head 113, in relation to the angled ribs 905 of the housing 109, in the upward position and the downward position.

It is understood that the angles of each of the angled ribs 905 and the angled top 911 are similar and/or complementary to one another, but need not be identical. In particular in the unrecessed position of the camera head 113, an outward end 1005 of the angled ribs 905 resides against a bottom portion 1011 of the angled top 911. Furthermore, the outward end 1005 may be at least partially curved to better apply pressure to the angled top 911 as the angled top 911 slides along the angled ribs 905 when the pressure 510 is applied to the outward face 117 of the front plate 925 of the camera holder 111.

For example, when the pressure 510 is applied to the outward face 117 of the front plate 925 of the camera holder 111, to move the camera holder 111 towards the rear of the housing 109 to the recessed position, the bottom portion 1011 of the angled top 911 begins to slide along the outward end 1005 of the angled ribs 905, and the angled ribs 905 apply pressure to the camera head 113 via the angled top 911, which causes the camera head 113 to move towards the downward position inside the camera holder 111.

In FIG. 10A, each of the springs 915, 921 are in an uncompressed position. However, in FIG. 10B, the spring 915 has compressed against the bottom interior surface 917 of the camera holder 111, and the springs 921 have compressed against the seats 903 of the housing 109. Hence, when the camera holder 111 is unlatched and/or released from the recessed position, the springs 921 move the camera holder 111 towards the unrecessed position, and the spring 915 moves the camera head 113 towards the upward position, as the angled top 911 slides along the angled ribs 905. Hence, the springs 915, 921 provide the dual direction motion of the camera head 113 and/or the camera device 115; however, any suitable biasing mechanism is within the scope of present examples.

With reference back to FIG. 9B, it is understood that the angled top 911 of the camera head 113 slopes down between the shoulders 929 of the chassis 913; hence, as also depicted in FIG. 10B, the size and position of the angled ribs 905 are such that the angled ribs 905 are located between the shoulders 929 of the chassis 913.

Figure 11:
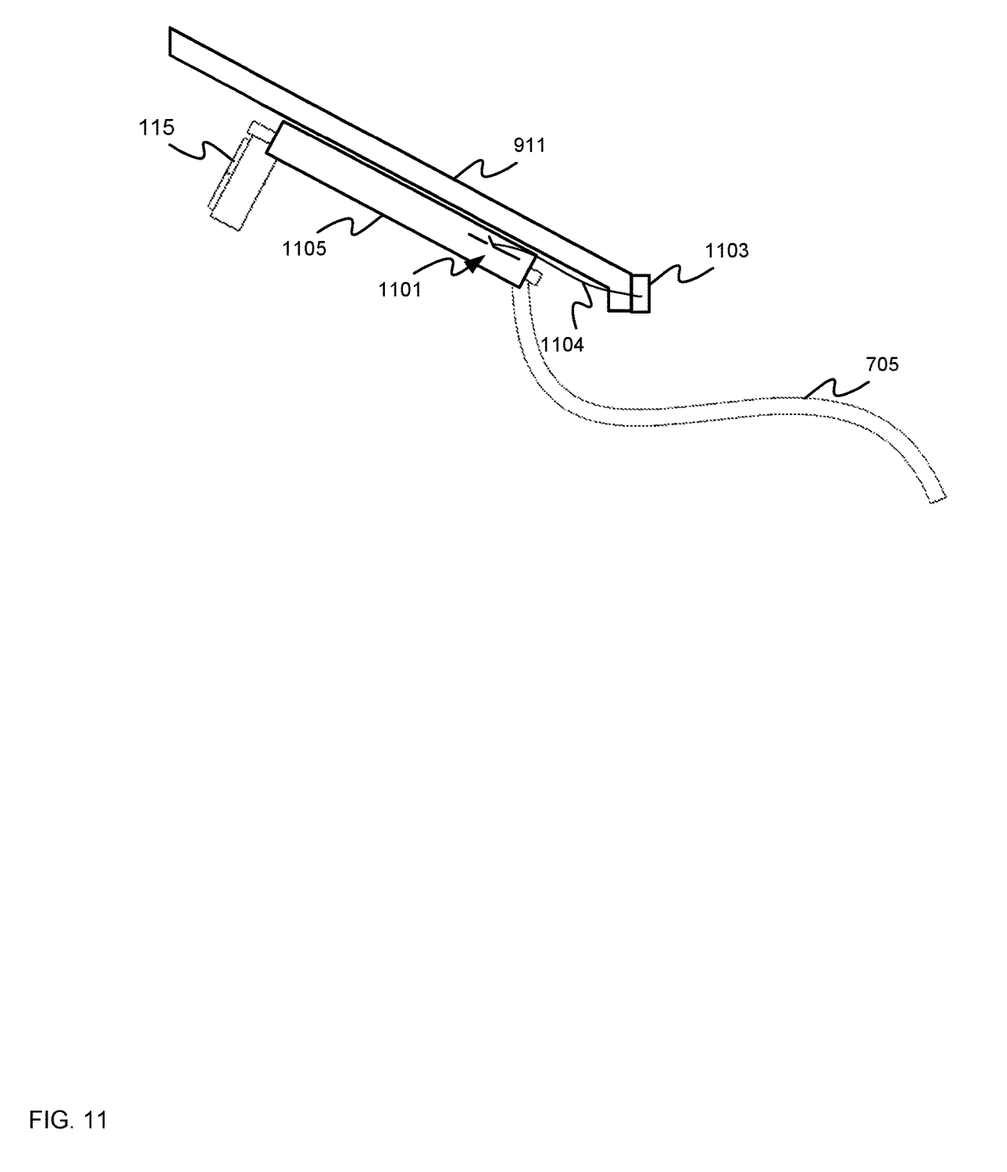
FIG. 11 depicts electronic components of the assembly of FIG. 4.

Attention is next directed to FIG. 11 which depicts a schematic diagram of electronic components of the camera head 113 including the camera device 115. In some examples, the camera device 115 turns off when the camera head 113 is in the downward position, and the camera device 115 turns on when the camera head 113 is in the upward position. Hence, in some examples, as depicted in FIG. 11, the camera head 113 (and hence the assembly 401 and/or the device 101) comprises a switch 1101 to turn the camera device 115 on and off. For example, the camera head 113 (and hence the assembly 401) may comprise a detector 1103 to detect when the camera head 113 is in the upward position and the downward position. The detector 1103 may comprise a mechanical detector mounted adjacent the angled top 911 such that when the angled top 911 slides along the angled rib 905, and/or when the camera head 113 is in the downward position for example within the camera holder 111, the detector 1103 is actuated, for example against the angled rib 905 and/or against a rear wall of the camera holder 111. Alternatively, the detector 1103 may comprise a proximity detector. Alternatively, the detector 1103 may be combined with the switch 1101. However, the detector 1103 may be any suitable detector in any position to detect when the camera head 113 is in the upward position and the downward position.

However, as depicted, the switch 1101 is generally in communication with the detector 1103 (e.g. as depicted via wiring 1104, and the like), the switch 1101 to: turn the camera device 115 on when the camera head 113 is in the upward position, as detected by the detector 1103; and turn the camera device 115 off when the camera head 113 is in the downward position, as detected by the detector 1103.

The switch 1101 may be an electronic switch which may be a component of an electronic interface 1105 to a display screen (e.g. the display screen 103) and/or a communication device, the electronic interface 1105 to generally communicate signals from the camera device 115 to the display screen and/or the communication device, the electronic interface 1105 to further signal to the display screen and/or the communication device when the camera device 115 is on or off, for example via the cable 705. While only the switch 1101 of the electronic interface 1105 is depicted it is understood that the electronic interface 1105 generally includes any suitable electronic components for communication with a display screen and/or a communication device, for example to conduct a webcam-based communication session using the camera device 115.

Figure 12:
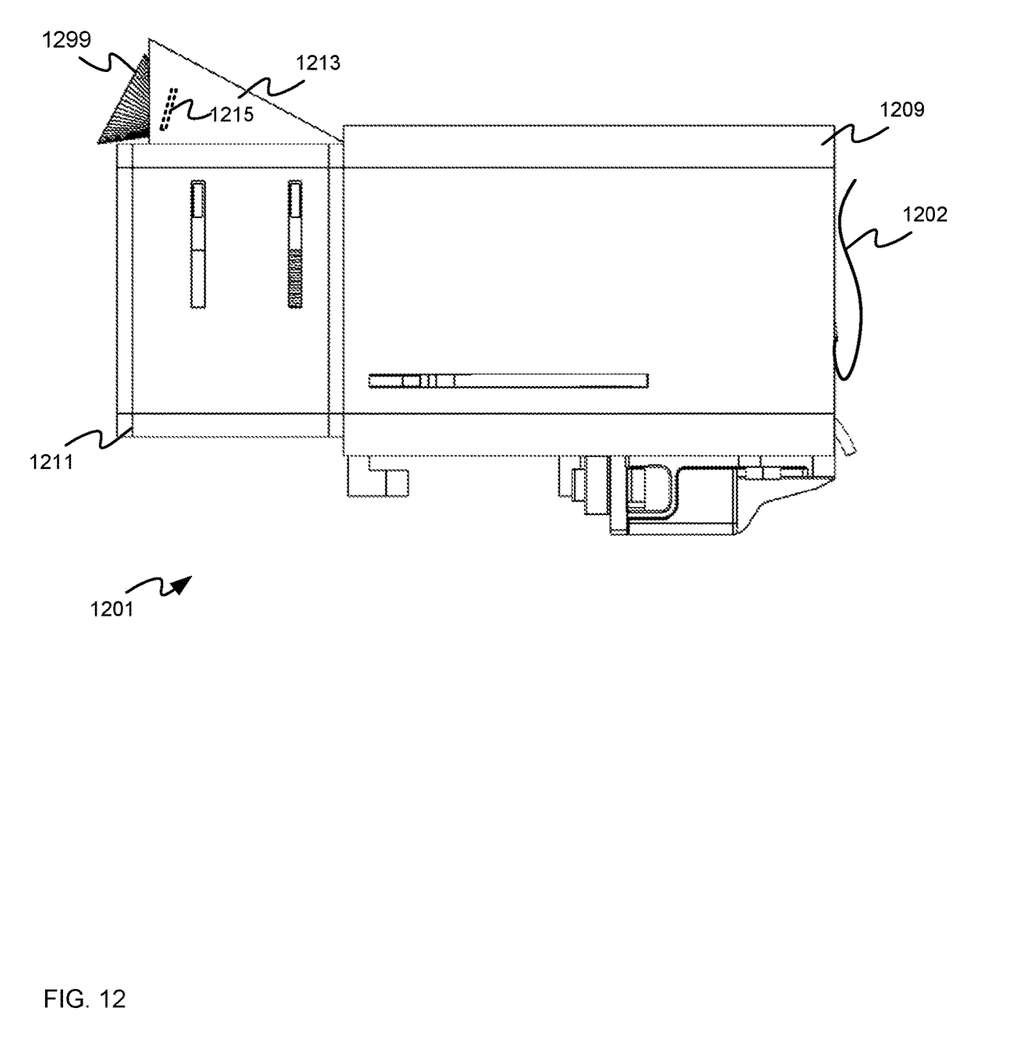
FIG. 12 depicts an example device that includes a dual direction popup camera, in an open configuration, that may be attached to a display device and/or a communication device.

Attention is next directed to FIG. 12 which depicts a side view of an alternative device 1201 which may be attached to a display screen and/or a bezel of a display screen and/or a communication device. The device 1201 is substantially similar to the assembly 401 but lacks the tabs 403. Rather the device 1201 includes a mounting mechanism 1202 to mount and/or temporarily mount, a housing 1209 of the device 1201 to a display screen, and/or a bezel of a display screen, and/or a communication device. Hence, mounting the device 1201 to a display screen may include mounting the device 1201 to a bezel of the display screen. When the device 1201 is mounted to a communication device, the device 1201 may be mounted to a display screen of the communication device and/or a bezel of a display screen of the communication device and/or a housing of the communication device. The communication device may be a laptop, a personal computer, a mobile communication device, and the like.

As depicted, the mounting mechanism 1202 comprises a clip attached to a rear of the housing, and extending in an upwards direction such that device 1201 may be mounted on a bottom edge of a display screen and/or a bezel thereof, and/or at a bottom edge of a display screen of a communication device. However, the mounting mechanism 1202 may be any suitable mounting mechanism for mounting the device 1201 in any suitable orientation to any suitable edge of a display screen and/or a bezel thereof, and/or to any suitable edge of a display screen of a communication device. The components of the device 1201 are generally otherwise similar to the components of the assembly 401.

Hence, the device 1201 comprises: the housing 1209; the mounting mechanism 1202 to mount the housing 1209 to a display screen and/or a bezel of a display screen and/or a communication device; a camera holder slideably mounted in the housing, the camera holder 1211 to slide in the housing 1209 between a recessed position and an unrecessed position (as depicted); a camera head 1213 slideably mounted in the camera holder 1211, the camera head 1213 to slide between a downward position, when the camera holder 1211 is in the recessed position, and an upward position (as depicted), when the camera holder 1211 is the unrecessed position, the camera head 1213 including a camera device 1215 (depicted dashed lines as in the view in FIG. 12, the camera device 1215 is internal to the camera head 1213) angled outward (and, for example, upward), relative to the housing 1209, when the camera head 1213 is in the upward position and the camera holder 1211 is in the unrecessed position, the camera holder 1211 and the housing 1209 containing the camera head 1213 and the camera device 1215, when the camera head 1213 is in the downward position and the camera holder 1211 is in the recessed position. Also depicted in FIG. 12 is a sensing cone 1299 of the camera device 1215.

It should be recognized that features and aspects of the various examples provided above may be combined into further examples that also fall within the scope of the present disclosure.

The invention claimed is:

1. A device comprising:
a display screen having a bezel, the display screen having a bottom edge;
a housing mounted in the bezel;
a camera holder slideably mounted in the housing, the camera holder to slide in the housing between a recessed position and an unrecessed position;
a camera head slideably mounted in the camera holder, the camera head to slide between a downward position, when the camera holder is in the recessed position, and an upward position, when the camera holder is the unrecessed position; and
the camera head including a camera device which is angled outward, relative to the display screen, when the camera head is in the upward position and the camera holder is in the unrecessed position,
the camera holder and the housing containing the camera head and the camera device, when the camera head is in the downward position and the camera holder is in the recessed position, wherein the housing comprises an angled guide along a ceiling of the housing, and the camera head comprises an angled top to slide along the angled guide, the angled guide to press on the angled top of the camera head as the camera holder is sliding into the recessed position to guide the camera head into the downward position.

2. The device of claim 1, further comprising a latch device to receive and latch the camera holder when the camera holder slides to the recessed position, the latch device to release the camera holder from the recessed position when pressure is received at an outward face of the camera holder.

3. The device of claim 1, further comprising a guide mechanism at the camera holder and the camera head, the guide mechanism to guide the camera head between the upward position and the downward position in the camera holder.

4. The device of claim 1, wherein the camera head is biased towards the upward position.

5. A device comprising:
a housing;
a mounting mechanism to mount the housing to a display screen;
a camera holder slideably mounted in the housing, the camera holder to slide in the housing between a recessed position and an unrecessed position;
a camera head slideably mounted in the camera holder, the camera head to slide between a downward position, when the camera holder is in the recessed position, and an upward position, when the camera holder is the unrecessed position; and the camera head including a camera device angled outward, relative to the housing, when the camera head is in the upward position and the camera holder is in the unrecessed position, the camera holder and the housing containing the camera head and the camera device, when the camera head is in the downward position and the camera holder is in the recessed position, wherein the housing comprises an angled guide along a ceiling of the housing, and the camera head comprises an angled top to slide along the angled guide, the angled guide to press on the angled top of the camera head as the camera holder is sliding into the recessed position to guide the camera head into the downward position.

6. The device of claim 5, further comprising a push-push latch device to receive and latch the camera holder when the camera holder slides to the recessed position, the push-push latch device to release the camera holder from the recessed position when pressure is received at an outward face of the camera holder.

7. The device of claim 5, further comprising slots and complementary pins at the camera holder and the camera head, the slots and the complementary pins to guide the camera head between the upward position and the downward position in the camera holder.

8. The device of claim 5, wherein the camera device turns off when the camera head is in the downward position, and the camera device turns on when the camera head is in the upward position.

9. A device comprising:

a housing;

a camera holder slideably mounted in the housing, the camera holder to slide in the housing between a recessed position and an unrecessed position;

a camera head slideably mounted in the camera holder, the camera head to slide between a downward position, when the camera holder is in the recessed position, and an upward position, when the camera holder is the unrecessed position; and the camera head including a camera device angled outward, relative to the housing, when the camera head is in the upward position and the camera holder is in the unrecessed position the camera device to turn on when the camera head is in the upward position, the camera holder and the housing containing the camera head and the camera device, when the camera head is in the downward position and the camera holder is in the recessed position, the camera device to turn off when the camera head is in the downward position, wherein the housing comprises an angled guide along a ceiling of the housing, and the camera head comprises an angled top to slide along the angled guide, the angled guide to press on the angled top of the camera head as the camera holder is sliding into the recessed position to guide the camera head into the downward position.

10. The device of claim 9, further comprising a switch to turn the camera device on and off.

11. The device of claim 9, further comprising a detector to detect when the camera head is in the upward position and the downward position, and a switch in communication with the detector, the switch to: turn the camera device on when the camera head is in the upward position, as detected by the detector; and turn the camera device off when the camera head is in the downward position, as detected by the detector.

12. The device of claim 9, further comprising an electronic interface to a display screen.

13. The device of claim 9, further comprising an electronic interface to a display screen, the electronic interface to signal to the display screen when the camera device is on or off.

* * * * *